US00RE39289E

(19) United States
(12) Reissued Patent
Mitchell et al.

(10) Patent Number: US RE39,289 E
(45) Date of Reissued Patent: Sep. 19, 2006

(54) APPARATUS AND PROCESS FOR MANUFACTURING ASPHALT

(75) Inventors: Gill N. Mitchell, Altamont, UT (US); Ned B. Mitchell, deceased, late of Altamont, UT (US); by Tawna Kay Mitchell, legal representative, Alamont, UT (US)

(73) Assignee: Ned B. Mitchell, Altamont, UT (US)

(21) Appl. No.: 10/115,373

(22) Filed: Apr. 3, 2002

Related U.S. Patent Documents

Reissue of:
(64) Patent No.: 6,045,608
Issued: Apr. 4, 2000
Appl. No.: 09/246,923
Filed: Feb. 9, 1999

(51) Int. Cl.
*C09D 195/00* (2006.01)

(52) U.S. Cl. ..... 106/273.1; 106/276; 106/279; 106/280; 106/284; 106/284.01; 106/284.02; 106/284.03; 106/284.04; 106/284.05; 106/284.06

(58) Field of Classification Search ..... 106/273.1, 106/276, 279, 280, 281.1, 284, 284.01, 284.02, 106/284.03, 284.04, 284.05, 284.06
See application file for complete search history.

(56) References Cited

U.S. PATENT DOCUMENTS 3,936,371 A * 2/1976 Ueda et al. ..... 208/251 H
RE31,905 E * 6/1985 Mendenhall ..... 106/281
4,549,834 A * 10/1985 Allen ..... 404/75
4,657,698 A * 4/1987 Najjar et al. ..... 252/373
4,705,538 A * 11/1987 Najjar et al. ..... 48/197 R
4,705,539 A * 11/1987 Najjar et al. ..... 48/197 R
4,708,788 A * 11/1987 Low ..... 208/390
4,732,700 A * 3/1988 Najjar et al. ..... 252/373
4,808,198 A * 2/1989 Richter ..... 48/197 R
4,875,906 A * 10/1989 Apel ..... 48/197 R
4,921,730 A * 5/1990 Sasaki ..... 427/138
5,083,382 A * 1/1992 Brashears ..... 34/135
5,196,058 A * 3/1993 Merrell ..... 106/278
5,318,199 A * 6/1994 Brashears ..... 222/146.2
5,515,620 A * 5/1996 Butler ..... 34/137
5,538,340 A * 7/1996 Brashears ..... 366/25
5,728,202 A * 3/1998 Nelson et al. ..... 106/284.01
5,772,317 A * 6/1998 Butler ..... 366/7
5,944,885 A * 8/1999 Yoshinaka et al. ..... 106/281.1
6,045,608 A * 4/2000 Mitchell et al. ..... 106/273.1
6,117,227 A * 9/2000 Kitagawa ..... 106/284.01
6,139,612 A * 10/2000 Kitagawa et al. ..... 106/284.1

* cited by examiner

*Primary Examiner*—David Brunsman
(74) *Attorney, Agent, or Firm*—Traskbritt, P.C.

(57) ABSTRACT

An improved process for making asphalt involves incorporating tar sands into a hot asphalt mix process and modifying the process. The improved process involves using a heated asphalt counter-flow drum mixer to admix asphaltic cement, coarse aggregate, and fine aggregate. During this mixing process, the admixture is heated to produce the asphaltic concrete. In the improved process from about 20 to about 80 percent tar sand is mixed with from about 80 to about 20 percent aggregate and from about 1 to less than about 5 percent liquid asphalt cement in a drum mixer to form an admixture, heating the admixture to a first elevated temperature (e.g., 250° and 400° F.) for a set period of time (e.g., 40 to about 90 seconds); and discharging the heated admixture at a second elevated temperature (e.g., from about 150° to about 350° F.) to produce asphaltic concrete. Preferably, the aggregate has a gradation of 10 to 25 percent passing a #4 sieve, and the admixture has substantially no added fines.

23 Claims, No Drawings

APPARATUS AND PROCESS FOR MANUFACTURING ASPHALT

Matter enclosed in heavy brackets [ ] appears in the original patent but forms no part of this reissue specification; matter printed in italics indicates the additions made by reissue.

TECHNICAL FIELD

This invention relates generally to processes for making asphalt, and more specifically to a method of incorporating tar sands into a process for producing hot asphalt and associated equipment therefor.

BACKGROUND

Tar sands (also known as "heavy oil sands" or "bituminous sand") are believed to be formed by infiltration of petroleum into porous sand near the Earth's surface. Tar sands are crude oil deposits that are substantially heavier (more viscous) than other crude oils. Tar sands are bitumen (a substance with the consistency of molasses that comprises up to 18% of the oil sands), which is a liquid-solid organic material, such as tar, asphalt, or heavy oil. This heavier crude oil has lost much of its lighter fraction of its original petroleum due to volatilization or oxidation. Often times, heavy oil is mixed with sand, hence, the name "heavy oil sands"; although it does not necessarily have to be mixed with sand. Some tar sands occur in limestone or clay.

Tar sands are generally of interest to geologists because they are a potentially huge source of petroleum. Crude oil (or tar) can be separated from enclosing rock with hot water or steam. Heavy crude oil then can be chemically upgraded into a lighter crude oil by "cracking" and/or "hydrogenation", which is used commercially. Tar sands require more processing than conventional crude oil and are therefore more expensive to utilize. Tar sands occur naturally throughout the world, including in Alberta, Canada, Argentina and Utah. Generally, tar sands are used to make "synthetic" oil and other petroleum products, although the processes for doing so are generally presently considered prohibitively expensive.

Other uses for tar sands have been contemplated. For instance, in Utah, native tar sands have been mined and placed on roads by trucks and graders to produce an asphalt road surface. Furthermore, several companies have tried, without great success, to produce a hot asphalt with native tar sand. Reportedly, ninety-six percent of all paved roads and streets in the U.S.—almost two million miles—are surfaced with asphalt, and to incorporate native tar sand into a hot asphalt production process would be an improvement in the art.

Unfortunately, using tar sand in a hot asphalt process has had several problems and drawbacks associated with it. For instance, with the prior art methods, excessive smoking occurs, the tar sands burn, and the tar sands can combust while in a drum mixer used in an asphalt-producing process. Furthermore, the material adheres to belting, and plugs feed bins and the drum mixer used in the process. It has also been difficult to attain a consistent feed when using tar sands in the asphalt mix.

It would be an improvement in the art if a relatively simple process existed for successfully incorporating tar sands into a hot asphalt process.

DISCLOSURE OF THE INVENTION

The invention includes an improved process for producing asphaltic concrete. Heretofore, such a process has involved using a heated asphalt counterflow drum mixer to admix a composition containing asphaltic cement, coarse aggregate, and fine aggregate to form an admixture. During this mixing process, the admixture is heated to produce the asphaltic concrete. In the improved process, a composition containing from about 20 to about 80 percent tar sand is mixed with from about 80 to about 20 percent aggregate and from about 1 to less than about 5 percent liquid asphalt cement in a drum mixer to form an admixture. The admixture is heated to a first elevated temperature (e.g., 250° and 400° F.) for a set period of time (e.g., 40 to about 90 seconds). It is then discharged at a second elevated temperature (e.g., from about 150° to about 350° F.) to produce asphaltic concrete. Preferably, the aggregate used in the process has a gradation of 10 to 25 percent passing a #4 sieve, and the admixture has substantially no added fines.

As is described more thoroughly herein, the resulting asphalt has attributes in comparison to prior art asphalt. For instance, it is more pliable, and the lower temperatures used yield better self-repair during summer months and make it less uncomfortable for workers applying the hot asphaltic to a road surface. Furthermore, it is less adhesive to beds of haul trucks and relatively less expensive to make since it uses little liquid asphalt cement ("AC") and no fines.

BEST MODE OF THE INVENTION

As is known to those of skill in the art, asphaltic concrete is a uniformly mixed combination of asphaltic cement, coarse aggregate, fine aggregate, and other materials, depending on the type of asphaltic concrete. Hot-mix, hot-laid asphaltic concrete is produced by properly blending asphalt cement, coarse aggregate, fine aggregate, and filter (dust) at temperatures ranging from about 175° to 325° F., depending on the type of asphalt cement used. Hot-mix, hot-laid asphaltic concrete is generally used for high-type pavement construction and can be described as open-graded, coarse-graded, dense-graded, or fine-graded mixtures.

The underlying equipment for making hot-mix asphaltic concrete is also known. For instance, in U.S. Pat. No. 5,772,317 to Butler (Jun. 30, 1998), a system is described which uses a heated drum mixer. This drum mixer has an inclined drum rotatable about its axis, an inlet at its upper end, and an asphaltic concrete product outlet at its lower end. A burner assembly extends through the breeching at the lower end of the drum, and mounts a burner head spaced from the lower drum end to define a drying zone between the burner head and the asphaltic concrete product outlet. Flighting is typically spaced circumferentially about and longitudinally along the interior wall of the drying zone of the drum to carry and veil aggregate input to the drum at its upper end. Hot gases of combustion from the burner flow in the drying zone counter-currently to the direction of flow of the aggregate through the drum, the hot gases flowing through the veiling aggregate too remove dust and moisture from the aggregate and exiting the drum for flow to a separator, e.g., a baghouse.

The mixing chamber includes an annular chamber between the burner tube assembly which projects into the drum from its lower end wall and the drum walls. A liquid asphalt pipe extends into the mixing chamber for discharging liquid asphalt onto the dried aggregate flowing into the mixing chamber whereby the dried aggregate and asphalt form asphaltic concrete.

Used or recycled asphaltic product and/or mineral filter, dust and/or additives may also be disposed in the drum for mixing in the mixing chamber with the hot dried aggregate whereby the final asphaltic concrete product comprises virgin aggregate, recycled asphaltic product, and applied liquid asphalt. Drums of this type have been successfully used for many years in the asphalt industry.

The instant invention utilizes improvements in this previously described process. For instance, and as previously described, native tar sand is impregnated with a rich oil. If fines are added to the native tar sand, however, the mixture is unsuitable for use on roads. In the inventive process, a rock aggregate is mixed with the tar sands for incorporation into the tar sand asphalt. The mixing process typically takes from about 20 to 80 seconds. The aggregate to tar sand ratio used in the mix is as follows:

20–80% aggregate blended with tar sands

20–80% tar sands blended with aggregate.

As used in this specification, all percentages are weight percentages unless a different percentage is indicated by usage.

As is more thoroughly described hereinafter, various recycled asphalt product ("RAP") may serve as equivalents to native tar sand for incorporation in the composition used in the instant process. When such a substitution for native tar sand is made, however, the remaining ingredients used in the instant may, depending upon the particular composition of the particular RAP, then need to be adjusted accordingly to achieve a composition as described herein. For instance, RAP made from native tar sand asphalt originally containing no liquid asphalt concrete (i.e., RAP made by the instant process) may be substituted directly for native tar sand in the instant process. If the instant process is to be used with RAP made from a more typical asphalt not originally containing native tar sand, the liquid asphalt concrete portion of the more typical asphalt concrete will need to be estimated or otherwise determined, as well as the other constituents of the more typical asphalt, and the other constituents in the instant process adjusted accordingly. If a road surface composition containing only native tar sand and gravel is used as a "RAP" (although not an "asphalt" in the true sense of the word), the relative proportions of the native tar sand and gravel need to be estimated or otherwise determined, and the constituents of the instant process adjusted accordingly.

For use with the instant invention, a rock aggregate gradation having 0–15% passing a #4 sieve was used. Such a gradation is almost a straight rock product. This rock aggregate gives stability to the native tar sands without adding additional fines to the mixture. This aggregate (23,000 tons) was analyzed, and had the following characteristics:

Coarse Gradation (AASHTO T27):

| Sieve size | Weight Ret. | % Ret. | % Total Passing | Specs |
|---|---|---|---|---|
| 0.75 in. | | | 100 | 100 |
| 0.5 in. | 235.1 | 11.6 | 88.4 | |
| 0.375 in. | 668.4 | 33.0 | 55.4 | 46–78 |
| #4 | 844.0 | 41.7 | 13.7 | 0–15 |

Fine Gradation (AASHTO T27):

| Sieve size | Weight Ret. | % Ret. | Specs |
|---|---|---|---|
| #8 | 243.6 | 12.0 | 1.7 |
| #200 | 22.6 | 1.1 | 0.6 |
| Total | 20230 | | |

Another rock aggregate gradation extremely useful with the invention was used. This aggregate was also analyzed, and determined to have the following characteristics:

Coarse Gradation (AASHTO T27):

| Sieve size | Weight Ret. | % Ret. | % Total Passing |
|---|---|---|---|
| 0.75 in. | | | 100 |
| 0.5 in. | 154.1 | 11.6 | 88.4 |
| 0.375 in. | 408.8 | 30.7 | 57.7 |
| #4 | 502.2 | 37.7 | 20.0 |

Fine Gradation (AASHTO T27):

| Sieve size | Weight Ret. | % Ret. | |
|---|---|---|---|
| #8 | 157.7 | 11.8 | 8.2 |
| #16 | 78.8 | 5.9 | 2.3 |
| #50 | 22.1 | 1.7 | 0.6 |
| #200 | 41 | 0.3 | 0.3 |
| Total | 1331.5 | | |

The preferred mixture of rock aggregate to native tar sand is approximately 70% rock to 30% native tar sand. Approximately, 25% of rock aggregate is added to the native tar sands, then is screened on a one inch sieve screen to remove oversized materials.

The aggregate tar sand mix time will typically take from 40 to 90 seconds and will occur at temperatures from about 250° to about 400° F.

Baghouse temperatures, at the inlet, will typically be in the range of about 140° to about 350° F. Independently, baghouse temperatures, at the outlet, will typically be in the range of about 140° to about 350° F.

Liquid asphalt cement ("AC") should be introduced in an amount ranging from greater than 1% to as much as less than about 5% of the total asphalt composition. Preferred is an amount of about one percent (1%) to about four percent (4%) per ton. Especially preferred is an amount of about 1.5% liquid AC added to the mixing process to give the tar sand more stability.

Asphaltic cement is a bituminous binder. It is obtained after separation of the lubricating oils in a petroleum recovery and refining process. Asphaltic cements are semisolid hyrodcarbons with certain physiochemical characteristics that make them good cementing agents. They are also very viscous, and when used as a binder for aggregates in pavement construction, it is necessary to heat both the aggregates and the asphalt cement before mixing the two materials.

Asphalt cement is designated by its penetration and viscosity, both of which give an indication of the consistency of the material at a given temperature. For use with the instant invention, the penetration value of the asphalt cement will preferably vary from about 200–300 to about 60–70 (distance in 1/10 of a millimeter that a standard needle will penetrate a given sample under well-defined conditions of loading, time and temperature). Especially preferred are viscosity graded (original) asphalt cements AC-20, AC-10, AC-5, and AC-25, viscosity graded (residue) AR-16000, AR-8000, AR-2000, and AR-1000, and penetration graded 60–70, 85–100, 120–150, and 200–300. Equivalents to these asphalt cements may include PG (polymer graded), SC (slow cure), MC (moderate cure), and mixtures of one or more thereof.

The temperature of the discharged mix will typically vary from about 150° to about 350° F., although temperatures of 200° to 240° F. are highly preferred.

The invention is further explained by the following illustrative example:

EXAMPLE

A. Original Equipment:

A PORTABLE ULTRAPLANT™ asphalt plant (available from Gencor Industries, Inc. of Orlando, Fla.) was obtained without a recycled asphalt pavement ("RAP") Feeder Bin. This asphalt plant (see, e.g., U.S. Pat. No. 5,772,317 to Butler (Jun. 30, 1998), U.S. Pat. No. 5,538,340 to Brashears (Jul. 23, 1996), and U.S. Pat. No. 5,515,620 also to Butler (May 14, 1996), the contents of all of which are incorporated by this reference) was modified to include a larger RAP opening, a larger RAP collar chute, clean-out openings/swing doors placed under the RAP collar, and more wipers at the RAP opening inside the drum mixer. The recycle collar had a directional RAP feed inlet chute with a manual divert calibration chute located directly below the inlet chute.

Instead of using the Gencor feed bin, a feeder from a rock crusher was modified and used in the asphalt plant. The drive motor was removed from the feeder and replaced with a variable speed motor (also purchased from Gencor) that interfaced with the computer equipment associated with the asphalt plant. Retaining wing walls were also installed. No flow sensors were added above the belt. A steep retaining wall was added to the feeder. An axle and towing attachment were added to make the feeder portable.

The feeder was further modified by changing the pulleys to decrease the speed at which the tar sand would feed into the drum entry system of the asphalt plant.

Experimentation and Resulting Equipment Modifications:

During experimentation, it was discovered that the liquid AC pump supplied with the asphalt plant was too large, and would not allow introduction of liquid AC below the amount of five percent (5%) per ton. The pump was thus removed, and replaced with a pump having a micro-motion injection system and a smaller injection feed pump (a VIKING positive pressure pump available from Gencor of Orlando, Fla.) Also during this experimentation, the RAP collar entry opening was modified to stop build-up of tar sands. The RAP feed conveyor return rollers were replaced with self-cleaning rollers.

The feed of a straight virgin rock without fines was also a problem. Without fines, too much heat passed into the baghouse causing damage to the dust collector bags. The flighting in the drum was thus changed to create a more dense veil.

C. Process:

A mixture of tar sand and rock aggregate (25%) was fed into the feeder, and fed via conveyors into the drum at the RAP opening at a rate of approximately 55% tar sands mixture to 45% virgin rock aggregate. The tar sands/rock mixture was retained in the drum for approximately 30 seconds. The virgin rock aggregate was fed into the drum through the virgin entry. The length of time the virgin rock aggregate was in the drum was approximately 181 seconds. Approximately 1% liquid AC was added to the mixing process to give the tar sand more stability. The exit temperature of the tar sands asphalt was between 200 and 240° F. The tar sand asphalt continued to coat and mix as it passed up the slate conveyor and through the load out silo.

D. Road Application:

The resulting tar sand asphalt was applied with a Caterpillar lay down machine. The beds of the haul trucks did not require the use of diesel or release agents to prevent sticking as is generally required with hot mix asphalt. Accordingly, there was no waste with the tar sands asphalt.

E. Resulting Composition:

The resulting tar sand asphalt differed from hot mix asphalt in various beneficial ways. As previously identified, tar sand asphalt had an exit temperature of about 200 to 240° F. while a typical exit temperature for hot mix asphalt is 300° F. or higher. Besides being somewhat safer, the decreased temperatures should result in somewhat more employee comfort.

Compositionally, tar sand asphalt does not need additional virgin fines or the usual amounts of liquid AC. Tar sand contains a broader spectrum of petroleum constituents, including various "light ends", which liquid AC loses during the refining process. Having more "light ends" the resulting tar sand asphalt is more pliable than standard hot mix asphalt, and tends to heal itself during the hot summer months.

F. Recycling:

Any unused tar sands asphalt is returned to the tar sand pile, broken up, and reheated for use in the future.

References herein to a specific Example or specific embodiments should not be interpreted as limitations to the invention's scope which is determined by the claims.

What is claimed is:

1. An improvement in a process for producing asphaltic concrete of the type involving using a heated asphalt counterflow drum mixer wherein a composition comprising asphaltic cement, coarse aggregate, and fine aggregate is heated and mixed in a hot mix process to produce the asphaltic concrete, the improvement comprising:

admixing a composition comprising from about 20 to about 80 percent tar sand, by weight, with from about 80 to about 20 percent aggregate, by weight, and from about 1 to less than about 5 percent, by weight, liquid asphalt cement in said drum mixer to form an admixture from said composition;

heating said admixture at a first elevated temperature for a set period of time; and discharging said heated admixture at a second elevated temperature to produce asphaltic concrete.

2. The improvement of claim 1 wherein said liquid asphalt cement is present in said composition in an amount of about 1.5 to about four percent.

3. The improvement of claim 2 wherein the first elevated temperature varies between 250° and 400° F. and the set period of time is from about 40 to about 90 seconds.

4. The improvement of claim 3 wherein the second elevated temperature is from about 150° to about 350° F.

5. The improvement of claim 4 wherein the second elevated temperature is from about 200° to about 2400 F.

6. The improvement of claim 4 wherein the composition comprises from about 65 to about 75 percent aggregate, from about 25 to about 35 percent tar sand and about 1 percent liquid asphaltic cement.

7. The improvement of claim 6 wherein the aggregate has a gradation of 10 to 25 percent passing a #4 sieve.

8. The improvement of claim 7 wherein the admixture has substantially no added fines.

9. Asphaltic concrete produced by the process of claim 1.

10. The asphaltic concrete of claim 9 wherein said asphaltic concrete is produced by a process containing liquid asphalt cement present in said composition in an amount of about one to about four percent.

11. The asphaltic concrete of claim 9 characterized in containing from about 65 to about 75 percent aggregate, from about 25 to about 35 percent tar sand and about 1 percent liquid asphaltic cement.

12. The asphaltic concrete of claim 11 wherein the aggregate used in the process has a gradation of 10 to 25 percent passing a #4 sieve.

13. The asphaltic concrete of claim 9 wherein the admixture used in the process has substantially no added fines.

14. An improvement in a process for producing asphaltic concrete of the type involving using a heated asphalt counterflow drum mixer wherein a composition containing asphaltic cement, coarse aggregate, and fine aggregate is heated and mixed to produce the asphaltic concrete, the improvement comprising:

admixing, without added fines, a composition, said composition comprising from about 65 to about 75 percent tar sand with from about 25 to about 35 percent aggregate, by weight, said aggregate having a gradation of 10 to 25 percent passing a #4 sieve, and from about 1 to about 4 percent liquid asphalt cement in said drum mixer to form an admixture from said composition;

heating said admixture at a temperature of about 250° to about 350° F. for from about 40 to about 90 seconds; and discharging said heated admixture at a temperature of from about 200° to about 240° F. to produce asphaltic concrete.

15. The improvement of claim 14 wherein the admixture comprises about 1.5 percent liquid asphaltic cement.

16. Self-healing asphalt comprising a hot-mixed, hot laid admixture of comprising, by weight, from about 20 to about 80 percent tar sand, from about 80 to about 20 percent aggregate, and from about 1 to less than about 5 percent, liquid asphalt cement.

*17. A composition resulting from hot mixing an admixture containing by weight:*

*from about 20 to about 80 percent tar sand;*

*from about 80 to about 20 percent aggregate; and*

*from about 1 to about 5 percent liquid asphalt cement.*

*18. A self healing asphalt formed by hot laying the composition of claim 17.*

*19. A composition according to claim 17, wherein said tar sand component comprises recycled tar sand product.*

*20. A process for producing asphaltic concrete, comprising:*

*forming an admixture containing by weight, about 20 to about 80 percent tar sand, about 80 to about 20 percent aggregate and about 1 to about 5 percent liquid asphalt cement;*

*heating said admixture in a vessel form a time interval; and*

*discharging said heated admixture from said vessel at an above ambient temperature.*

*21. Asphaltic concrete produced by the process of claim 20.*

*22. A process according to claim 20, wherein said tar sand component comprises recycled tar sand product.*

*23. A process according to claim 20, wherein said heated admixture is discharged from said vessel at a temperature between about 150 and about 350 degrees Fahrenheit.*

* * * * *

UNITED STATES PATENT AND TRADEMARK OFFICE

CERTIFICATE OF CORRECTION

PATENT NO. : RE39,289 E
APPLICATION NO. : 10/115373
DATED : September 19, 2006
INVENTOR(S) : Gilman Ned Mitchell, Ned B. Mitchell, deceased and Tawna Kay Mitchell It is certified that error appears in the above-identified patent and that said Letters Patent is hereby corrected as shown below:

On the title page:

In ITEM (75) Inventors: change "Gill N. Mitchell" to --Gilman Ned Mitchell--

In the claims:

| | | |
|---|---|---|
| CLAIM 16, COLUMN 8, | LINE 4, | change "admixture of comprising," to --admixture comprising,-- |
| CLAIM 20, COLUMN 8, | LINE 27, | change "in a vessel form a" to --in a vessel for a-- |

Signed and Sealed this
Eighth Day of November, 2011

David J. Kappos

David J. Kappos
*Director of the United States Patent and Trademark Office*